W. J. A. LONDON.
PACKING GLAND.
APPLICATION FILED JULY 24, 1911.
1,058,075.
Patented Apr. 8, 1913.
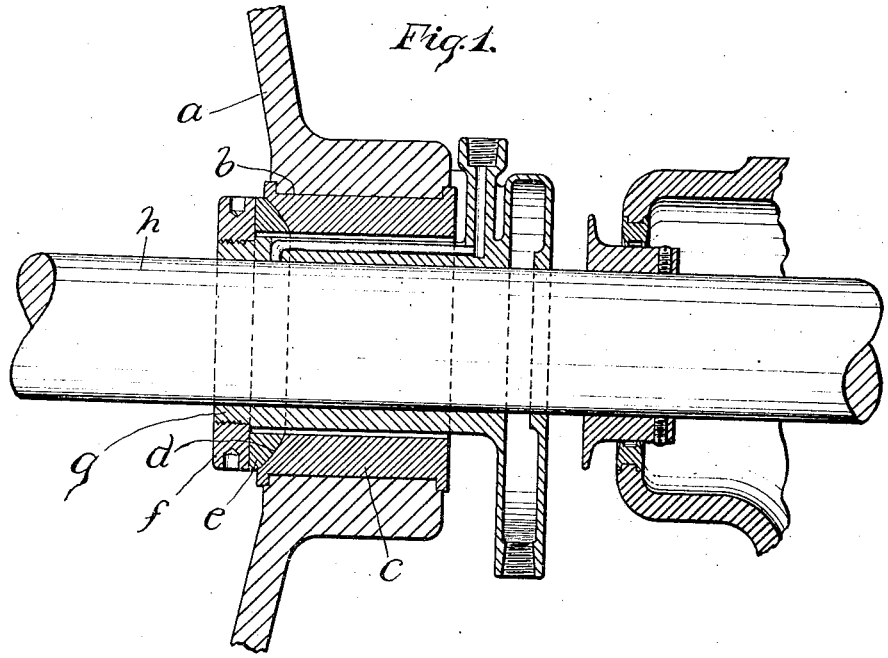
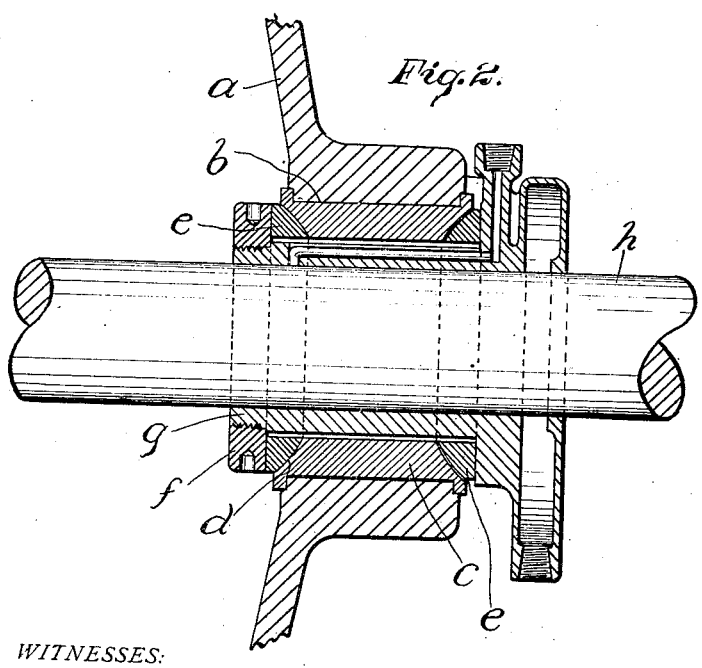
WITNESSES:
M. E. Neill
M. A. Shuckerow
INVENTOR.
W. J. A. London
BY N. E. Hart
his ATTORNEY.

UNITED STATES PATENT OFFICE.

WILLIAM J. A. LONDON, OF HARTFORD, CONNECTICUT, ASSIGNOR TO THE TERRY STEAM TURBINE COMPANY, OF HARTFORD, CONNECTICUT, A CORPORATION OF CONNECTICUT.

PACKING-GLAND.

1,058,075.  Specification of Letters Patent.  Patented Apr. 8, 1913.

Application filed July 24, 1911. Serial No. 640,121.

*To all whom it may concern:*

Be it known that I, WILLIAM J. A. LONDON, a subject of the King of England, and a resident of Hartford, in the county of Hartford and State of Connecticut, have invented certain new and useful Improvements in Packing-Glands, of which the following is a specification.

The object of this invention is to produce a packing gland adapted for use in steam turbines to effectually cut off the casing from communication with the outside atmosphere, the arrangement being such that the gland is held on its seat by the action of the turbine actuating fluid, such as steam, whether it be pressure or vacuum, and at the same time making provision to accommodate the movement of the shaft due to its whipping between its supporting bearings which is occasioned by the speed of rotation and the action of the jet.

In the drawings: Figure 1 is a central vertical section showing a part of the casing and the gland applied thereto. Fig. 2 is a view similar to Fig. 1, but showing a double seal for the casing in order to prevent leakage from or to the machine when the actuating fluid is being expanded to a point above or below atmospheric pressure.

Referring to the drawings: *a* denotes the casing having a central aperture *b* in which is mounted a sleeve *c* having at one or both ends a slightly curved seat *d* against which the packing ring *e* rests, being held in place by the lock nut *f* threaded and secured on the end of the bronze bushing *g* in which the shaft *h* rotates. It will be observed that a clearance is provided between the sleeve *c* and the bronze bushing *g* so that the shaft may move laterally and the curved contacting faces of the packing ring *e* and the sleeve *c* permit of the slight rocking of the ring due to the distortion of the shaft, at the same time maintaining a surface contact of large area. The pressure of the actuating fluid within the casing will hold this ring firmly against its seat thus providing an effective seal without the use of any mechanical devices. Where the protection is also desired when the actuating fluid is being expanded below atmospheric pressure a packing ring may be positioned similarly to that above described but at the outer end of the sleeve *c*, the vacuum within the casing tending to hold the ring firmly on to its seat. It is difficult to provide a satisfactory mechanical device for holding the rings on their seats in turbines because of the whipping action of the shaft, and for the efficiency of operation of the machine the escape of air or gas into or out of the casing must be avoided. By my invention I have provided a device which is extremely effective, very simple and inexpensive and which allows for all of the peculiar conditions which exist in steam turbine work. It will be understood that but one side of the casing is shown and that where the shaft passes through the opposite side of the casing a similar gland is employed.

I claim as my invention:

1. In a device of the character described a casing having apertures through its walls for the reception of a shaft, a non-rotatable sleeve secured in said apertures, a non-rotatable shaft bushing within said sleeve but adapted for slight movement relatively thereto, a shaft supported in said bushing, a curved seat formed in an end of said sleeve, a packing ring fitting against said seat and spaced from said bushing, said ring being adapted for movement relatively to said sleeve, and means for holding said ring in position.

2. In a turbine, bearings, a shaft supported thereon, a rotor carried by said shaft, a casing for said rotor located between said bearings and having apertures in its side walls through which said shaft extends, and means for producing a fluid tight joint between said casing and shaft and comprising a non-rotatable bushing fitting said shaft, a non-rotatable sleeve fitting within the aperture in the casing, said bushing and sleeve being spaced apart so that the former may move relative to the latter, a curved seat formed in an end of said sleeve, a packing ring fitting on to said seat and spaced from said bushing and a lock nut secured to said bushing and adapted to engage said ring for the purposes specified.

3. A turbine casing having alined apertures through its side walls, sleeves fixedly located in each aperture, curved seats at the inner ends of said sleeves, packing rings fitting said seats, a shaft, non-rotatable bushing located within said sleeves but spaced therefrom, and means carried by said bushings for holding said rings in place, the pressure within the casing holding said rings securely against their seats and at the same time allowing them to move relatively to said sleeves.

4. In a turbine a steam tight casing having alined apertures in its side walls, sleeves fixedly secured in said apertures, bearings smaller in diameter than said sleeves located therein, a shaft extending through said casing and rotarily supported in said bushings, a curved seat at an end of each sleeve, an annular packing ring having one face shaped to fit said seat, rings mounted on the bushings and engaging said packing rings to hold them up in position, said packing rings being adapted for movement on their seats and held against their seats to form fluid tight joints by forces existing within said casing.

WILLIAM J. A. LONDON.

Witnesses:
JOHN D. STOUT,
T. B. BOWNE.